US009226117B2

(12) United States Patent
Vos et al.

(10) Patent No.: US 9,226,117 B2
(45) Date of Patent: Dec. 29, 2015

(54) DYNAMIC ASSIGNMENT OF CELL BROADCAST MESSAGE IDENTIFIERS

(71) Applicant: SIERRA WIRELESS, INC., Richmond (CA)

(72) Inventors: Gustav Gerald Vos, British Columbia (CA); Steven John Bennett, Coquitlam (CA); Richard Thomas Kavanaugh, Encinitas, CA (US)

(73) Assignee: Sierra Wireless, Inc., Richmond (CA)

( * ) Notice: Subject to any disclaimer, the term of this patent is extended or adjusted under 35 U.S.C. 154(b) by 68 days.

(21) Appl. No.: 13/628,588

(22) Filed: Sep. 27, 2012

(65) Prior Publication Data

US 2013/0083717 A1    Apr. 4, 2013

Related U.S. Application Data

(60) Provisional application No. 61/541,446, filed on Sep. 30, 2011.

(51) Int. Cl.
*H04W 4/06* (2009.01)
*H04W 72/00* (2009.01)
*H04W 8/26* (2009.01)

(52) U.S. Cl.
CPC .............. *H04W 4/06* (2013.01); *H04W 72/005* (2013.01); *H04W 8/26* (2013.01)

(58) Field of Classification Search
USPC .................................................. 370/312–330
See application file for complete search history.

(56) References Cited

U.S. PATENT DOCUMENTS

| | | | |
|---|---|---|---|
| 6,778,833 | B1 | 8/2004 | Fortuna |
| 7,269,146 | B2 | 9/2007 | Pecen et al. |
| 7,426,203 | B1 | 9/2008 | McNamara et al. |
| 7,626,962 | B1 | 12/2009 | Zhang et al. |
| 7,738,421 | B2 | 6/2010 | McNamara et al. |
| 7,864,729 | B2 | 1/2011 | Zhang et al. |
| 7,965,682 | B2 | 6/2011 | McNamara et al. |

(Continued)

FOREIGN PATENT DOCUMENTS

CA     2626110     4/2007

OTHER PUBLICATIONS

ETSI TS 123 038 "Alphabets and language-specific information" (3GPP TS 23.038) (Mar. 2011).

(Continued)

*Primary Examiner* — Brandon Renner
(74) *Attorney, Agent, or Firm* — DLA Piper LLP (US)

(57) ABSTRACT

A method and apparatus for broadcast communication from a broadcast entity to terminals of a wireless communication network. A request for broadcast access to the wireless communication network is received, the request comprising an indication of a predetermined feature. In response, a dynamic association is established between the feature and an identifier selected from a pool of currently unused identifiers. Messages are then received from the broadcast entity, the messages associated with the predetermined feature. The messages are then broadcast along with the identifier. Broadcasting may be via Cell Broadcast Service (CBS), with the CBS Message Identifier as said identifier. The terminals are configured to optionally use the identifier for selective message processing. Upon a predetermined expiry condition, the identifier may be returned to the pool for re-use. Information regarding the temporary association may be published to the terminals.

23 Claims, 4 Drawing Sheets

(56) References Cited

U.S. PATENT DOCUMENTS

| | | | |
|---|---|---|---|
| 2001/0034753 A1* | 10/2001 | Hildebrand et al. | 709/107 |
| 2004/0198279 A1* | 10/2004 | Anttila et al. | 455/179.1 |
| 2005/0083961 A1* | 4/2005 | Pecen et al. | 370/432 |
| 2006/0248578 A1* | 11/2006 | Denton | 726/5 |
| 2007/0220279 A1* | 9/2007 | Northcutt et al. | 713/193 |
| 2008/0020763 A1* | 1/2008 | Fischer | 455/435.1 |
| 2008/0102749 A1 | 5/2008 | Becker | |
| 2010/0017463 A1* | 1/2010 | Horn et al. | 709/203 |
| 2010/0062723 A1 | 3/2010 | Tao et al. | |
| 2011/0081883 A1 | 4/2011 | Daly | |
| 2011/0128911 A1 | 6/2011 | Shaheen | |
| 2011/0151898 A1* | 6/2011 | Chandra et al. | 455/466 |
| 2011/0171923 A1* | 7/2011 | Daly et al. | 455/404.1 |
| 2011/0201365 A1 | 8/2011 | Segura | |
| 2011/0274040 A1 | 11/2011 | Pani et al. | |
| 2012/0004003 A1 | 1/2012 | Shaheen | |
| 2012/0030358 A1 | 2/2012 | MacKenzie | |
| 2012/0106391 A1 | 5/2012 | van Loon et al. | |
| 2012/0140677 A1 | 6/2012 | Choi et al. | |
| 2013/0122906 A1 | 5/2013 | Klatt | |
| 2013/0315074 A1 | 11/2013 | Kim et al. | |
| 2014/0098671 A1 | 4/2014 | Raleigh et al. | |
| 2014/0105009 A1 | 4/2014 | Vos et al. | |
| 2014/0314043 A1 | 10/2014 | Kim et al. | |
| 2014/0341109 A1 | 11/2014 | Cartmell et al. | |

OTHER PUBLICATIONS

ETSI TS 123 041 "Technical Realization of Cell Broadcast Service" (3GPP TS 23.041) (Apr. 2011).
ETSI TS 123 042 "Compression algorithm for text messaging services" (3GPP TS 23.042) (Mar. 2011).
ETSI TS 148 049 "Cell Broadcast Service Protocol" (3GPP TS 48.049) (Apr. 2011).
3GPP TS 23.041 "3rd Generation Partnership Project; Technical Specification Group Core Network and Terminals; Technical Realization of Cell Broadcast Service (CBS) (Release 11)," Serial No. Serial No. 3GPP TS 23.041 V11.0.0, Dec. 2010, 3GPP Organizational Partners.
Cell Broadcast System Factsheet "The SMS CB Function in Mobile Networks".
Cell Broadcast System Factsheet "Muslim Prayer Service".
Cell Broadcast System Whitepaper "Discovering CB Services".
Cell Broadcast System Whitepaper "Displaying CB Messages".
Cell Broadcast System Whitepaper "Languages in EU-Alert".
Cell Broadcast System Whitepaper "Managing CB messages".
Cell Broadcast System Whitepaper "Support of languages".
One2many Introduces Machine-to-Machine Cell Broadcast. http://www.businesswire.com/news/home/20130320005756/en/one2many-Introduces.
Cell Broadcast Forum—What is Cell Broadcast.
U.S. Appl. No. 13/918,303, filed Jun. 14, 2013 (related application).
International Search Report regarding PCT/CA2013/050458.
One2many: "*The SMS CB Function in Mobile Networks*"; Cell Broadcast System Factsheet, Apr. 22, 2008, 2 pgs.
One2many: "*Muslim Prayer Service*"; Cell Broadcast System Factsheet, Apr. 7, 2008, 1 pg.
One2many: "*Discovering CB Services*"; Cell Broadcast System Whitepaper, Dec. 8, 2010, 3 pgs.
One2many: "*Displaying CB Messages*"; Cell Broadcast System Whitepaper, Mar. 15, 2011, 6 pgs.
One2many: "*Languages in EU-Alert*"; Cell Broadcast System Whitepaper, Dec. 10, 2010, 4pgs.
One2many: "*Managing CB messages*"; Cell Broadcast System Whitepaper, Sep. 2, 2010, 2 pgs.
One2many: "*Support of languages*"; Cell Broadcast System Whitepaper, Dec. 10, 2010, 5 pgs.
One2many: "*One2many Introduces Machine-to-Machine Cell Broadcast*".; Business Wire, Mar. 20, 2013, 2 pgs.
Cell Broadcast Forum: "*What is Cell Broadcast*", Cell Broadcast System Factsheet, Aug. 22, 2013, 2 pgs.
European Search Report issued on Feb. 12, 2015 regarding EP 12 835 534.4.
International Search Report issued on Oct. 15, 2013 regarding PCT/CA2013/050458.

* cited by examiner

DYNAMIC ASSIGNMENT OF CELL BROADCAST MESSAGE IDENTIFIERS

CROSS-REFERENCE TO RELATED APPLICATIONS

This application claims the benefit and priority of U.S. Provisional Patent Application No. 61/541,446, filed Sep. 30, 2011. The foregoing application is incorporated by reference herein in its entirety.

FIELD OF THE TECHNOLOGY

The present technology pertains in general to cellular communications and in particular to dynamic assignment of cell broadcast message identifiers.

BACKGROUND

Various cellular wireless networks include a mechanism by which information can be broadcast to a collection of wireless terminals. This is in contrast to point-to-point services such as Short Messaging Service (SMS) text messaging. The Cell Broadcast Service (CBS) example of a broadcast service implemented, for example, in GSM and UMTS networks.

CBS is used to send emergency alerts within a geographic area, in accordance with the Commercial Mobile Alert System (CMAS) protocol. CBS has also been proposed for use in other applications, such as matchmaking, advertising, and broadcasting information related to various topics such as news, traffic, weather, finance, and the like. Each CBS message contains a message identifier (MID) parameter which identifies the source and type of the message. Wireless terminals can then attempt to receive CBS messages whose MID parameters match those in a configurable search list stored by the terminal. Various other aspects of current CBS implementation are discussed in the document "$3^{rd}$ Generation Partnership Project; Technical Specification Group Core Network and Terminals; Technical Realization of Cell Broadcast Service (CBS) (Release 11)," Serial No. 3GPP TS 23.041 V11.0.0, December 2010, 3GPP Organizational Partners. However, the current CBS implementation is limited in its ability to service different types of broadcast information. For example, many of the MID parameters are currently reserved for emergency or future use.

Therefore there is a need for a method and apparatus for facilitating broadcast communication from a broadcast entity to terminals serviced by a wireless communication network that is not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide for dynamic assignment of cell broadcast message identifiers. In accordance with an aspect of the present technology, there is provided a method for facilitating broadcast communication from a broadcast entity to terminals serviced by a wireless communication network, the method comprising: receiving, by a computing system, a request for broadcast access to the wireless communication network, the request comprising an indication of a predetermined feature; in response to the request, establishing, by the computing system or by another computing system, a temporary association between the predetermined feature and an identifier selected from a pool of currently unused identifiers; receiving, by the computing system, one or more messages provided by the broadcast entity, the one or more messages associated with the predetermined feature; and broadcasting the one or more messages via the wireless communication network, each of the messages broadcast along with the identifier, wherein the terminals are configured to optionally use the identifier to trigger selective processing of the messages.

In accordance with an aspect of the present technology, there is provided an apparatus configured to facilitate broadcast communication from a broadcast entity to terminals serviced by a wireless communication network, the apparatus comprising: a broadcast entity interface configured to receive a request for broadcast access to the wireless communication network, the request comprising an indication of a predetermined feature, the broadcast entity interface further configured to receive one or more messages from the broadcast entity, the one or more messages associated with the predetermined feature; a dynamic assignment module operatively coupled to the broadcast entity interface, the dynamic assignment module configured, in response to the request, to: select an identifier from a pool of currently unused identifiers; and establish a temporary association between the broadcast session and the identifier; and a network interface module operatively coupled to the dynamic assignment module, the broadcast entity interface and the wireless communication network, the network interface module configured to: convey the one or more messages along with the identifier to the wireless communication network for broadcast thereby, wherein each of the messages is broadcast along with the identifier, and wherein the terminals are configured to optionally use the identifier to trigger selective processing of the messages.

In accordance with an aspect of the present technology, there is provided a computer program product comprising a computer readable memory storing computer executable instructions thereon that when executed by a computer perform a method for facilitating broadcast communication from a broadcast entity to terminals serviced by a wireless communication network, the method comprising: receiving a request for broadcast access to the wireless communication network, the request comprising an indication of a predetermined feature; in response to the request, establishing a temporary association between the predetermined feature and an identifier selected from a pool of currently unused identifiers; receiving one or more messages provided by the broadcast entity, the one or more messages associated with the predetermined feature; and broadcasting the one or more messages via the wireless communication network, each of the messages broadcast along with the identifier, wherein the terminals are configured to optionally use the identifier to trigger selective processing of the messages.

BRIEF DESCRIPTION OF THE FIGURES

These and other features of the technology will become more apparent in the following detailed description in which reference is made to the appended drawings.

DETAILED DESCRIPTION OF THE TECHNOLOGY

Definitions

The term "channel" is used to define a medium by which information can be conveyed from a sender to one or more receivers. Different channels can be physically and/or logically separated from one another. For example, a physical channel may be separated into plural logical channels as follows. A substantially unique code can be associated with each logical channel, and a sender can convey messages via a logical channel by implicitly or explicitly including the associated code in the messages. A receiver can access the logical channel by selectively processing the messages which contain the associated code.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

The present technology provides a method and apparatus for dynamic assignment of cell broadcast message identifiers. In accordance with an aspect of the present technology, there is provided a method for facilitating broadcast communication from a broadcast entity to terminals serviced by a wireless communication network.

Figure 1A:
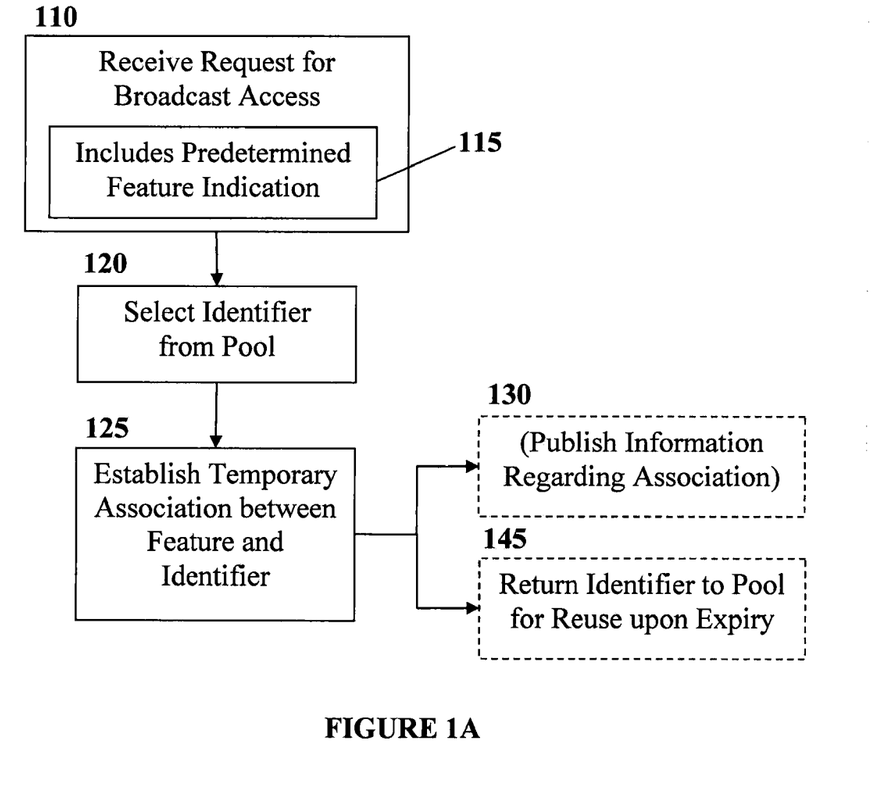
FIGS. 1A and 1B illustrate a method for facilitating broadcast communication from a broadcast entity to terminals serviced by a wireless communication network, in accordance with embodiments of the technology.
Figure 1B:
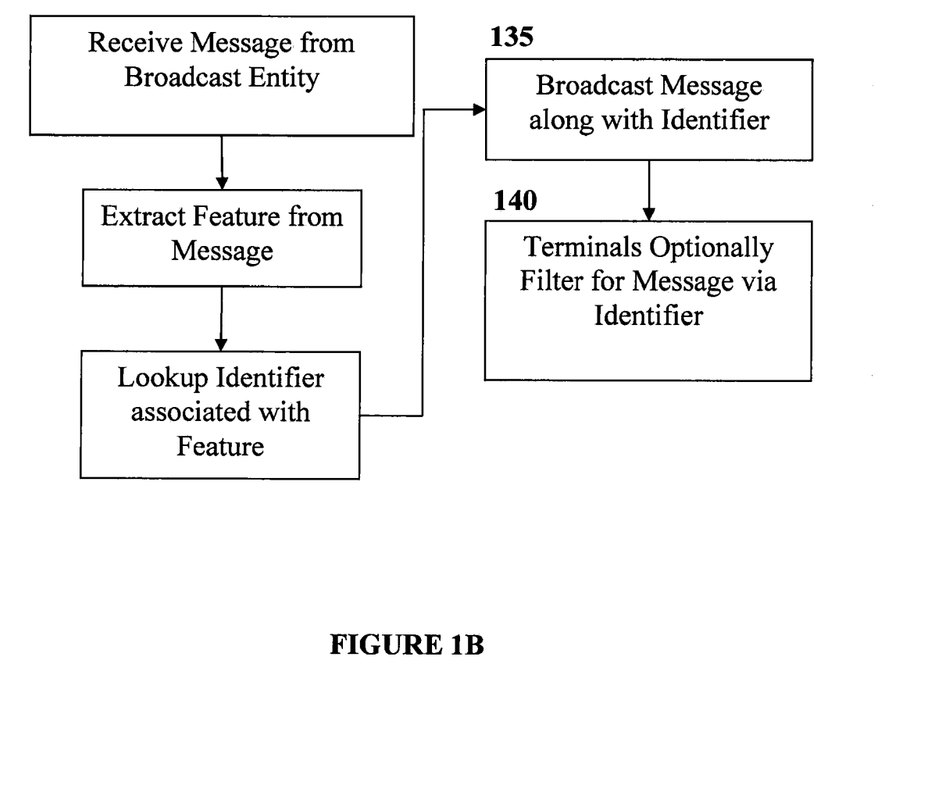

Referring to FIG. 1A, the method comprises receiving 110 a request for broadcast access to the wireless communication network. The one or more messages may be subsequently provided by the broadcast entity, as illustrated in FIG. 1B. The request comprises 115 an indication of some predetermined, for example indexable and/or identifiable feature. The request and the subsequent messages may be received via a secure channel. For example the predetermined feature may include a broadcast session index and/or one or more common descriptive parameters, such as message source and message type. The method further comprises, in response to the request, establishing 125 a temporary association between the predetermined feature and an identifier selected 120 from a pool of currently unused identifiers. The identifier may be a CBS message identifier (MID), for example. The method may further optionally comprise making available 130 information indicative of the temporarily established association to at least one of the terminals serviced by the wireless communication network. Information regarding identifiers should be made available to terminals before at least some of the messages are sent, so that the terminals may be given the chance to filter and receive the messages as desired. (Alternatively, the terminals may be configured to temporarily store messages for later filtering, although this configuration may require significant amounts of memory and processing.) For example, the information may be broadcast or included in a CBS index or directory, in such a manner that all terminals or authorized terminals can determine current identifiers of interest. Alternatively, temporary identifiers and/or temporary associations may be discovered or tracked by terminals using another means. The method may further comprise returning 145 the identifier to the pool for re-use in response to satisfaction of a predetermined expiry condition. For example, the expiry condition may be the expiry of a lease time or explicit cancellation of the association by one or more of the broadcast entity, a mobile network operator, and an operator of the method. In addition to lease expiry the MNO may revoke the assignment for other reasons, for example non-payment of a subscription by a broadcast entity.

In some embodiments, the terminals may also be notified following the expiry condition. The actual identifier (e.g. MID) may be included in a cancellation order transmitted to various terminals. The order may be sent repeatedly but still not reach terminals that are powered down. Other methods such as requiring a MID validity check to be done on reboot and/or after a predetermined period of dormancy may be used to get these terminals back up-to-date. The validity check may comprise consulting an index or directory to determine validity of a given MID.

Referring to FIG. 1B, the method may further comprise broadcasting 135 the one or more messages via the wireless communication network. Each of the messages is broadcast along with the identifier. For example each message may comprise one or more CBS pages, each including the relevant MID prefix and at least a portion of the message. The terminals are configured to optionally use the identifier to trigger 140 selective processing of the messages. In particular, the method may comprise receiving messages from the broadcast entity, extracting or otherwise determining a predetermined feature of the messages, if present, and looking up the identifier associated with that predetermined feature, so that the correct identifier can be broadcast into the network along with the message.

Another aspect of the present technology provides a computer program product comprising a computer readable memory storing computer executable instructions thereon that when executed by a computer perform the method as described above and/or a method as described elsewhere herein.

In accordance with yet another aspect of the present technology there is provided an apparatus configured to facilitate broadcast communication from a broadcast entity to terminals serviced by a wireless communication network. The apparatus may be a server, collection of servers, computers associated with nodes within the wireless network infrastructure, or the like.

Figure 2:
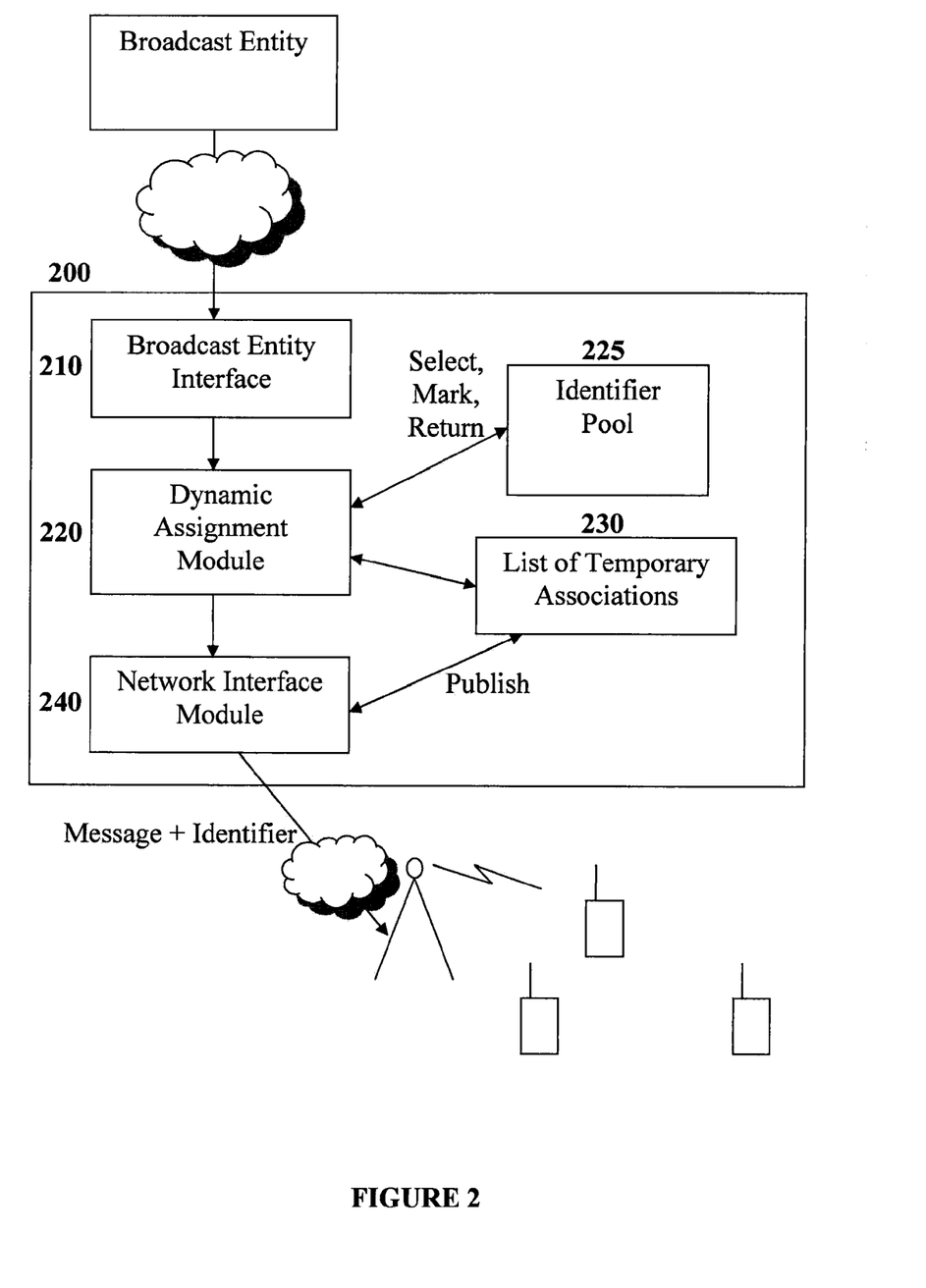
FIG. 2 illustrates an apparatus for facilitating broadcast communication from a broadcast entity to terminals serviced by a wireless communication network, in accordance with embodiments of the technology.

Referring to FIG. 2, the apparatus 200 comprises a broadcast entity interface 210 configured to receive a request for broadcast access to the wireless communication network, for example comprising a request for assignment of an identifier, such as a Message ID, for broadcast transmission of one or more messages. The request may be generated by the broadcast entity or another entity. The messages to be sent using this identifier are generally associated with a predetermined feature. The request also includes an indication of this predetermined feature, so that the appropriate messages can be recognized when they are received. The broadcast entity interface is also configured to receive the messages from the broadcast entity. The apparatus further comprises a dynamic assignment module 220 operatively coupled to the broadcast entity interface. The dynamic assignment module is configured, in response to the request, to select an identifier from a pool 225 of currently unused identifiers stored in computer memory. The dynamic assignment module is further configured to establish a temporary association between the predetermined feature (provided along with the request) and the identifier. The dynamic assignment module is further optionally configured to return the identifier to the pool for re-use in response to satisfaction of a predetermined expiry condition.

The apparatus further comprises a network interface module 240 operatively coupled to the dynamic assignment module, the broadcast entity interface and the wireless communication network. The network interface is configured to convey the messages, along with the identifier, to the wireless communication network for broadcast. To this end, the dynamic assignment module 220 or another modular component may be configured to extract and match predetermined features of incoming messages with the associated identifier, and to associate the message with the identifier for transmission. The network interface module may be configured to make available (for example publish), via the wireless communication network to at least one of the terminals serviced thereby, information indicative of the temporary association between the one or more messages and the identifier. The information may be contained in a list 230 of temporary associations, for example stored in memory and accessible via the network interface module 240. Alternatively, temporary identifiers and/or temporary associations may be discovered or tracked by terminals using another means.

Embodiments of the present technology facilitate the dynamic assignment of identifiers used in wireless network broadcasting. For example, embodiments of the present technology facilitate dynamic assignment of MID parameters in CBS. Dynamic assignment allows plural services and/or applications to share a finite pool of identifiers, thereby offering an advantage over static assignment. Dynamic identifier assignment may also allow for quicker and/or more flexible deployment of broadcast messaging into a network to facilitate existing services and/or applications.

In some embodiments, having dynamically assignable identifiers, such as MIDs enables service providers, applications and organizations to have identifiers assigned so that devices may subscribe to those services. For example, AirVantage™ or iTunes™ could have MIDs associated therewith so that users could request the enablement of reception of broadcast messages from those services.

In the currently specified CBS protocol, the MID field of the cell broadcast message is much larger (16 bits for $2^{16}$=65,536 addresses) than the number currently assigned to static services. For example, by some counts, Section 9.4.1.2.2 of the document "$3^{rd}$ Generation Partnership Project; Technical Specification Group Core Network and Terminals; Technical Realization of Cell Broadcast Service (CBS) (Release 11)," Serial No. 3GPP TS 23.041 V11.0.0, December 2010, 3GPP Organizational Partners in TS 23.041 indicates that only a few thousand of the about 65,000 addresses are assigned. In embodiments of the present technology, at least some of these unassigned codes are set aside for dynamic assignment.

Embodiments of the present technology, implemented with CBS, are backward compatible with legacy wireless terminals. For example, since the dynamically assigned MIDs would be unknown to the legacy wireless terminals, these would not watch for such MIDs and hence would not display messages sent with those MID's. On the other hand, individual wireless terminals, once informed of dynamically assigned MIDs of interest, can watch for and subsequently receive messages sent with these MIDs. Embodiments of the present technology may be implemented by other broadcast technologies, such as the Broadcast Control Channel (BCCH), or Multimedia Broadcast Multicast Services (MBMS).

Entity Responsible for Assigning Identifiers

Dynamic assignment of identifiers, such as MIDs, may be performed by mobile network operators (MNOs) or by a third party service. The identifiers may be assigned for use by web services, portals, and the like for example.

In some embodiments, identifiers are dynamically assigned for and/or by each MNO. Since the messages containing the identifiers are restricted to a particular wireless network, the same identifier can be re-used in plural, separate wireless networks.

In some embodiments, identifiers are dynamically assigned for use in one or plural wireless networks by a third-party service. Use of such a service can allow broadcast entities to avoid having to register their service with each of a plurality of mobile networks. In addition, the third-party service may assign the same identifier to the same service in different mobile networks. This may allow wireless terminals to avoid having to re-lookup identifiers when they switch between mobile networks.

In some embodiments, for example when a service is of local relevance only, an identifier may be assigned and used only within a predetermined region. The same identifier may be re-used for a different service in another region. This corresponds to a type of spatial re-use of identifiers. A region may be a city, province, state or country, for example. Identifiers may be unique spatially, temporally or both, in that a given identifier is associated with at most one broadcast entity and/or feature at a given time, a given region or both.

In some embodiments, a third-party global identifier assignment service is assigned a globally unique set or subset of identifier (for example MID) codes. The global identifier assignment service may connect, for example by Virtual Private Network (VPN), to a plurality of MNO core networks. The global identifier assignment service may then provide messages to be broadcast, along with their identifiers, to each MNO for delivery.

In some embodiments, when a MNO is the assigner of identifiers, the MNO can retain control of validating and charging for messages because it has full visibility of transactions between the service provider (broadcast entity) and the terminal devices. In the case of global dynamic identifier assignment by a third-party service, the third-party server providing the assignment service is a separate entity and may need to act as a broker for monetary or other such transactions. Mechanisms for acceptable charging and validation of identifier and message transactions between MNOs and the service providers (broadcast entities) may be implemented and maintained by acceptable secure means (for example VPN).

In embodiments of the present technology, dynamically assigned identifiers, such as CBS MIDs, can coexist with statically assigned identifiers, such as static MIDs, for example those MIDs assigned for emergency use in accordance with Commercial Mobile Alert System (CMAS) messages, for example issued by a Public Safety Answering Point (PSAP). The range of dynamically assignable identifiers may be kept separate from the set of static, pre-assigned identifiers.

Example System Architecture

Embodiments of the present technology may be implemented in association with various types of wireless networks capable of data communication. For example, the wireless network may be a GSM, UMTS, LTE or the like, wireless network. The wireless network generally includes an interface for wirelessly communicating with client terminal devices, such as mobile phones, computers, and the like. The wireless network further generally includes an interface for communicating with external entities, such as application servers, for example via an Internet link. Various means for implementing such wireless networks would be generally understood to a worker skilled in the art. Embodiments of the present technology may be implemented substantially at the interface between the wireless network and the interface for communicating with external entities.

Figure 3:
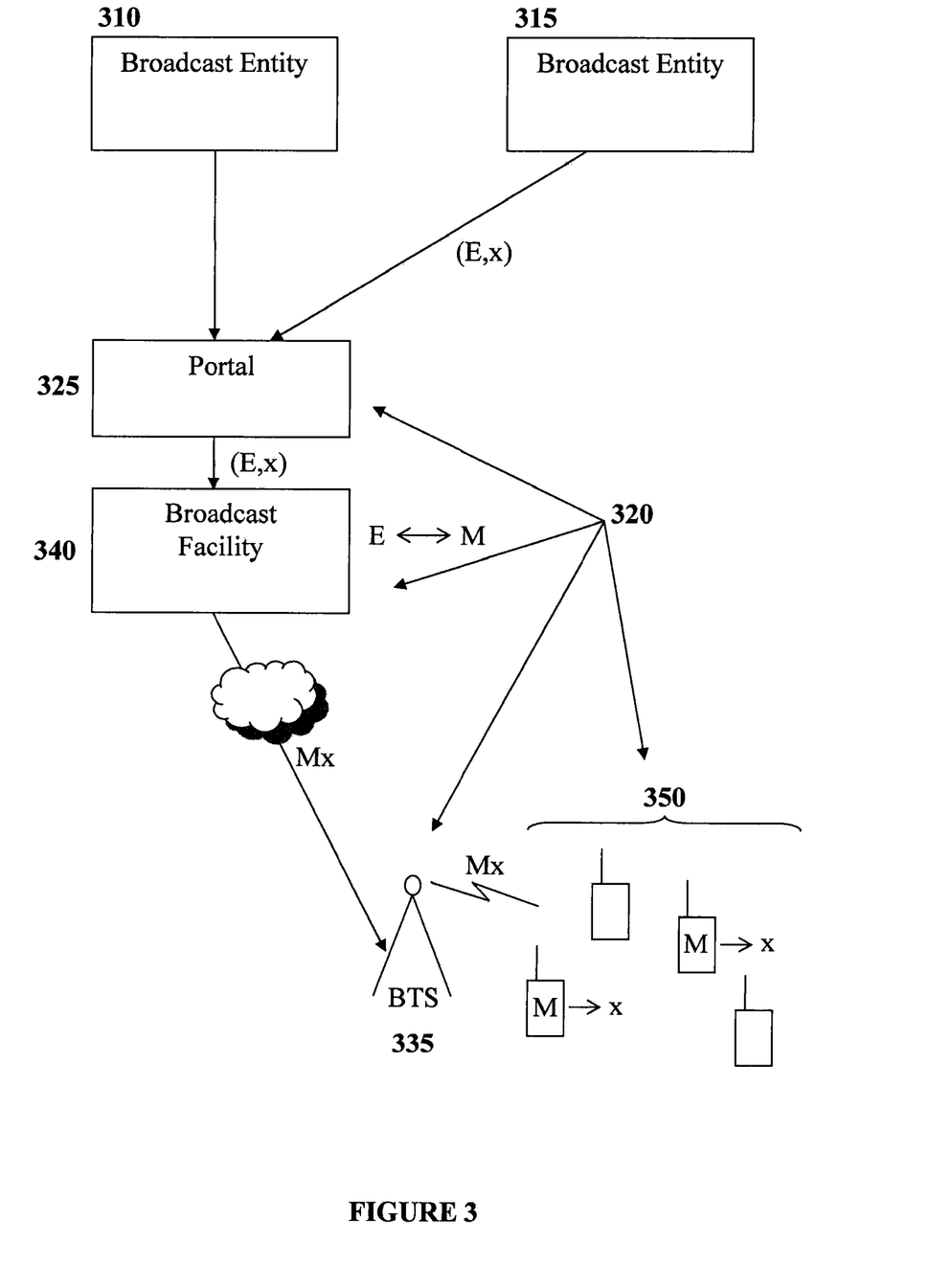
FIG. 3 illustrates a communication network, within the context of which some embodiments of the present technology operate.

FIG. 3 illustrates a communication network, within the context of which some embodiments of the present technology operate. In this particular example, the assignment entity is part of the wireless network, rather than an external third party. As illustrated, one or more broadcast entities 310, 315 communicate with a wireless communication network 320 through a portal 325. The wireless communication network comprises various infrastructure components, including at least one base transceiver station (BTS) 335 and at least one "broadcast facility" network node 340 configured to perform operations in accordance with the present technology. The wireless communication network further comprises plural wireless terminals 350 communicatively coupled to the BTS 335.

FIG. 3 further illustrates an example broadcast message flow, in accordance with an embodiment of the present technology. The broadcast entity 315 transmits a pair (E,x) wherein "E" is a predetermined feature associated with the message "x," such as message source and/or type. The broadcast facility 340 receives the pair (E,x). The broadcast facility looks up the current identifier M corresponding to the feature E, from a lookup table, cached in memory, or the like. The association between E and M may be preconfigured via a request for broadcast access. The broadcast facility 340 then generates the message Mx, which is the message x along with the identifier header M. The message Mx is broadcast by the BTS 335 and received by the wireless terminals 350. Some of the wireless terminals will be configured to listen for the identifier header M and to extract the message x associated therewith. The broadcast facility 340 may be coupled to the base transceiver station 335 via one or more network infrastructure components, such as base station controllers, radio network controllers, and the like.

As an example, a representative GSM network generally comprises a plurality of terminal devices, a base station subsystem, a network and switching subsystem, a GPRS core network, and an operations support system. The base station subsystem comprises plural base transceiver stations, one or more base station controllers, and a packet control unit. The GPRS core network comprises a gateway GPRS support node (GGSN), one or more serving GPRS support nodes (SGSN), and a backbone IP network. The GGSN operatively couples to external networks such as the Internet. The SGSN operatively couples to the base station subsystem, so that data can be sent from an external network, through the GPRS core network and the base station subsystem to the target terminal devices. Thus, embodiments of the present technology may be implemented substantially in the GPRS core network, and more specifically at the GGSN as a functional module or a server node operatively coupled to the GGSN.

Receiving Request

Embodiments of the present technology comprise receiving a request for broadcast access to a wireless communication network. The request generally represents a request to set up a broadcast channel and/or assign an identifier from a pool, the identifier to be associated with messages broadcast into the network on behalf of the broadcast entity. The request may be transmitted by a broadcast entity such as a server, for example associated with a particular web service or portal. The request may alternatively be transmitted by another entity on behalf of the broadcast entity.

In some embodiments, if a particular service or application wants to set up a broadcast access service, a portal associated with the broadcast entity (for example web service or application) makes a request to the mobile network operator, third-party service provider, or equipment thereof. The request is for dynamic assignment of an identifier such as an MID. To provide security and authentication, such a request may be made over a Virtual Private Network (VPN) with mutual authentication. Since the identifier is set by the mobile network operator, third-party service provider, or equipment thereof, it is not necessary to send the identifier to the broadcast entity. However, in some embodiments the identifier is provided to the broadcast entity to aid in processes such as quality control, verification, and facilitating discovery of the identifier by target wireless terminals. For example, the broadcast entity may publish the identifier for discovery by wireless terminals.

In some embodiments, the request may be an explicit request provided in a predetermined format. For example, the request may contain an identifier of the broadcast entity (which may be at least part of the predetermined feature), optionally along with other information such as payment or account information, authentication information, a type or content identifier of the messages, priority level, Quality of Service (QoS) requirements, requested lease time for the identifier assignment, or the like or a combination thereof. Payment or account information may be required if the broadcast communication service is a pay service provided to broadcast entities. The request may precede the messages provided by the broadcast entity, or the request may be provided substantially concurrently with the messages. In some embodiments, the message itself, or the first of a series of messages, may implicitly form the request.

In some embodiments, the request may include an indication of a predetermined feature which will also be associated with the one or more messages. Additionally, each message may include the predetermined feature, or an alias thereof. In one embodiment, the request may include the predetermined feature along with an alias, and the messages may include the alias, thereby referring to the predetermined feature. The predetermined feature may be a session identifier or web service identifier which is common to the one or more messages. The predetermined feature may be a descriptive identifier, for example in English, which is descriptive of common content, intended audience, and/or purpose of the one or more messages. The descriptive identifier may be formed from a predetermined limited dictionary, or it may be free form. As may be particularly compatible with CBS, the predetermined feature may comprise an identification of the message source and the message type, or alternatively one or more of the message source, message type, application associated with the message, type of application for which the message is intended, intended audience type, intended audience demographic, or the like. The predetermined feature may be indicative that the messages are intended for a certain group or subgroup of mobile devices, mobile devices having certain hardware or software properties, certain types of machine-type or M2M mobile devices, mobile devices having certain software applications running thereon, mobile devices with certain service subscriptions enabled, or the like, or a combination thereof.

In accordance with embodiments of the present technology, receipt of the request is performed by a broadcast entity interface of an associated apparatus. The broadcast entity interface may comprise standard network interface electronics hardware as would be readily understood by a worker skilled in the art, which are configured in accordance with the present technology. For example, the broadcast entity interface may appear as an Internet portal server accessible to broadcast entities via TCP/IP or another protocol.

Identifier Selection

Embodiments of the present technology comprise, in response to the request, selecting an identifier from a pool of currently unused identifiers. The identifier may be an identifier provided in accordance with a predetermined protocol. For example, the identifier may be a message identifier (MID) of the CBS protocol. The identifier may be selected at random or it may be selected as the next sequentially numbered identifier in an ordered list or selected in another manner.

In some embodiments, once an identifier is selected, it is removed from the pool, for example by marking the identifier as "in use." This ensures that the identifier is uniquely associated with only one predetermined message feature at a time.

For the CBS protocol, various message identifier ranges are currently available for allocation, or may be available for allocation in the future. The range 0000 to 03E7 can be allocated by the GSM Association, which could choose to allow at least a portion of this range to be used for purposes of the present technology. The ranges 03EC to 0FFF, 1108 to 1111, and 1901 to 9FFF are currently reserved, but could be allocated for purposes of the present technology in future CBS revisions. The range 1000-10FF is usable but not settable by man-machine interface (MMI). The range A000 to AFFF is currently available for allocation by network operators. The range B000 to FFFE is intended for future allocation to network operators. One or more of these ranges, or a subset of these ranges, may make up a pool of available message identifiers, in accordance with embodiments of the present technology.

In some embodiments, an identifier may be selected at least in part based on information indicative of prior associations between identifiers and features. For example, if a certain feature was previously associated with a certain identifier, and a request for broadcast access comprising the same feature or a similar feature is received, then the same identifier, if available, may be associated with that feature. This provides for recurrence of feature-identifier pairs over time. As another example, if a first feature is currently associated with a first identifier, and a request for broadcast access comprising a similar or related feature is received, then a numerically similar identifier may be associated with the similar or related feature. A numerically similar identifier may, for example be numerically consecutive or differing by one bit in a binary representation. This may simplify filtering for identifiers by terminals which may wish to selectively process messages related to both the first feature and the similar or related feature, for example by employing masking techniques to filter for groups of numerically similar identifiers.

In accordance with embodiments of the present technology, identifier selection is performed by a dynamic assignment module of an associated apparatus. The dynamic assignment module may comprise standard computing/processing and memory electronics, as would be readily understood by a worker skilled in the art, which are configured in accordance with the present technology. For example, a processor may be configured to execute instructions stored in memory, in order to manipulate objects held in a database or other data structure stored in local or remote memory. The dynamic assignment module further comprises interface electronics, communication hardware, and/or software interface means for communicating with the broadcast entity interface and network interface modules, which may be held in the same computing device as the dynamic assignment module or in one or more different computing devices.

Temporary Association of Identifier with Predetermined Feature

Embodiments of the present technology comprise, also in response to the request, establishing a temporary association between the predetermined feature and the identifier selected from the pool of currently unused identifiers.

In some embodiments, establishing the temporary association may comprise populating a lookup table. For example, a lookup table may comprise two columns, the first column containing all potential identifiers (such as MIDs), and the second column containing fields which can be populated with feature information. Establishing the temporary association then comprises accessing the row corresponding to the selected identifier, and populating the field in the second column and the accessed row with the appropriate predetermined feature information.

Other, substantially equivalent, methods for establishing the temporary association may also be used, as would be readily understood to a worker skilled in the art.

In some embodiments, selecting an identifier from the pool and establishing the temporary association can be performed in a single step. For example, a lookup table can be searched for a currently unused identifier (the set of all unused identifiers corresponding to the pool). Once such an identifier is found, it may be marked with information indicative of the association, thereby both marking the identifier as used and establishing the temporary association by way of the lookup table entry.

The temporary association, once created, can facilitate translation between the identifier and the predetermined feature, which may be descriptive information. Thus, incoming messages tagged with the predetermined feature can be associated with the correct identifier or set of identifiers to be used in transmission. In addition, in some embodiments, as described below, terminal devices or users may browse or search a published version of the associations to discover the identifiers corresponding to a sought feature.

The temporary association may persist as long as is necessary. It may be established well in advance of the first message to be broadcast, or it may be established "just in time" for the first broadcast. The temporary association may be configured to expire immediately after a broadcast session is finished, or it may be configured to persist for days, months, or years, and used for subsequent broadcasts in an extended session or session of indefinite length.

In accordance with embodiments of the present technology, temporary association of the identifier and the predetermined feature is performed by the dynamic assignment module.

Publishing Information Regarding Association

Some embodiments of the present technology comprise making available information indicative of the temporary association to at least one of the terminals serviced by the wireless communication network. As described herein, each terminal selectively processes broadcast information by monitoring for one or more identifiers embedded in broadcast messages. By this mechanism, terminals need not process all broadcasts but can restrict processing to only those broadcast messages of interest. Since the identifiers and the corresponding association information are dynamically assigned, publication of the information facilitates the terminals being able to track the values of identifiers of interest to that particular terminal, in order for the messages of interest to be reliably received and processed. Publishing information regarding associations may be made in a timely manner, so that terminals can track identifiers and associations of interest, and receive messages without undue delay or intervals of missed messages.

In some embodiments, the information comprises a list of currently assigned identifiers, such as MIDs, along with information associated therewith. The associated information can include a name of the source of the information, for example the broadcast entity, web service, or the like, a name for the type of information, one or more descriptive keywords, or other information useful in describing or discovering the service, such as associated communities, a sentence description, Internet links, forward or backward references to similar services, or the like.

In some embodiments, the information may also comprise time information, such as a lease time or time-to-live, indicative of when and/or how long current temporary associations between the predetermined feature and an identifier are valid. Thus, once a terminal obtains information regarding an identifier assignment, it can also be informed of when to check back to determine whether a new assignment has been made, and if so, what the new assignment is. Such information may also be useful if assignment information is propagated in a distributed fashion, since terminals may inform other terminals of relevant identifier information if they have a currently valid copy of that information stored locally. In some embodiments, the time information may be implicit. For example it may be pre-configured into each terminal that all associations of a certain type expire upon a predetermined date, after a predetermined time interval, after a predetermined number of broadcast messages, or the like.

In some embodiments, terminals, applications running on terminals, or terminal users, can determine or discover identifiers to monitor for by one or more of the following means: pre-configuration, configuration directly by the service provider, a lookup service, and upon request from the service provider. In some embodiments, configuration directly by the service provider may be performed via the Open Mobile Alliance (OMA) Device Management (DM) protocol, which may provide a mechanism for over-the-air terminal configuration, which may include updating an identifier watch list held by the terminal. Other protocols such as SIM-OTA may also be used.

In some embodiments, the lookup service operates as follows. The terminal provides a string-based search query to the lookup service, for example by SMS, web interface or email. The lookup service then performs a search for the query string and returns a corresponding identifier for a service associated with the query string.

In some embodiments, the information is published in a searchable and/or browseable index, for example hosted by an Internet server and/or residing on a website. The currently assigned identifiers may be published in the index along with associated information as described above. In some embodiments, the index is publicly available. In some embodiments, at least a portion of the index is available only upon authorization, payment, or the like. The index may be encrypted and made available via a purchased decryption key, for example.

In some embodiments, the information, or a portion thereof, is provided to terminals in one or more broadcast messages, private messages, over-the-air updates, or the like. In some embodiments, a selected portion of all current information is provided to each terminal. In some embodiments, all current information may be provided, for example in a series of ongoing broadcast updates. Each terminal can receive and process the broadcast updates when required to keep its internal watch list of identifiers current or up to date.

In some embodiments, broadcast messages, such as CBS messages, may be transmitted periodically, wherein each broadcast message includes at least some of the information indicative of current temporary associations. Such broadcast messages may be marked by a specific reserved MID or other identifier. Mobile devices may then maintain an up-to-date database of current association information by processing and storing information contained in the index broadcast messages.

In some embodiments, the information may be provided via the currently defined CBS index structure. As would be readily understood by a worker skilled in the art, the CBS index has a tree structure, with plural sub-indexes, and can be used by the operator to inform end users about the type of CBS services available. In accordance with embodiments of the present technology, the CBS index may be updated in a timely fashion so as to reflect current dynamically assigned MIDs and their corresponding associations. In one embodiment, dynamic assignment index information may be carried in one or more dedicated sub-indexes of the CBS index.

In accordance with embodiments of the present technology, publishing information regarding the association is facilitated by a network interface of an associated apparatus. The network interface may comprise standard network interface electronics hardware as would be readily understood by a worker skilled in the art, which are configured in accordance with the present technology. For example, the network interface may operate as a network node within a wireless network such as a GSM network, which is configured for interfacing with a short message service center (SMS-C), GPRS node such as a GGSN or SGSN, or the like.

Message Broadcasting

Embodiments of the present technology comprise broadcasting one or more messages, for example provided by the broadcast entity, via the wireless communication network. The messages may be provided at substantially the same time as the request for broadcast transmission, or at a different time, for example subsequent time. The messages are broadcast via the wireless network using a predetermined protocol, for example the CBS protocol. Once the identifier is assigned, formatting, handling and broadcasting the messages may be performed in a conventional manner, as would be readily understood by a worker skilled in the art.

As with the CBS protocol, each of the messages is broadcast along with the currently assigned identifier, for example contained in a message header. Each of the terminals connected to the wireless network is configured to optionally use the identifier to trigger selective processing of the messages. For example, each terminal may be configured to monitor broadcast messages for identifiers of interest, and to process those messages which contain identifiers of interest, while discarding other messages. The identifiers of interest may be held in a watch list stored in memory of a terminal.

Thus, for example, after a web service is registered with the network operator and a MID or other identifier has been dynamically assigned to the web service (that is after the request for broadcast access has been processed), the web service can send a message, via the network, to a subset of wireless terminals which are configured to recognize and respond to the MID. In some embodiments, a service level group ID may be provided within the broadcast message, for example as part of or in addition to the MID.

In particular, in some embodiments, the message may contain one or more additional identifier fields in addition to the MID or other identifier. The additional fields may define subsets of wireless terminals (or applications running thereon), which have been addressed by the MID. Terminals may be configured to react or respond in a predetermined manner when they fall within such a subset. Terminals may determine which (if any) subset they are in by processing the additional identifier fields to determine whether one field matches a field stored in memory. For example, terminals in different subsets may respond to messages in different ways, at different times, or the like.

In some embodiments, if there is a group address within or along with a MID then the MID plus the group address may be regarded as the identifier. For example, the group address may be used as an extension to the MID. In some embodiments a group of MIDs may be used to address terminals (or applications) or groups thereof, and concurrently to differentiate between subgroups. For example, an MID may be selected from a numerically sequential group of MIDs and used in a message. Upon receipt, each terminal may then check the most significant bits first. If the most significant bits match then the terminal may react and then check the least significant bits to see if they should respond or react.

In some embodiments, the broadcast entity or web service provider may also specify a geographical area in which the message is to be broadcast, for example by listing the base station IDs (or geographical parameters such as latitude/longitude ranges) via which the web service wishes to send the broadcast message, as would be readily understood to a worker skilled in the art. Thus, broadcast messages can be regionalized, and identifiers may potentially be re-used in different regions. Such regionalization may require careful management to ensure that broadcast identifiers do not unintentionally trigger devices.

In accordance with embodiments of the present technology, message broadcasting is facilitated by the network interface.

In accordance with embodiments of the present technology, messages for broadcasting are received by the broadcast entity interface.

Identifier Return and Reuse

Some embodiments of the present technology comprise returning the identifier to the pool response to satisfaction of a predetermined expiry condition. After an identifier has been returned to the pool, it may be subsequently re-used by the same broadcast entity or a different broadcast entity.

In some embodiments, returning the identifier to the pool and cancelling the currently assigned association may be performed by updating a lookup table, in order to clear fields indicative that the identifier is assigned and indicative of the assignment details.

In some embodiments, the predetermined expiry condition is the expiry of a predetermined lease time. In some embodiments, the predetermined expiry condition is an explicit command by the network operator or broadcast entity to return the identifier to the pool for re-use. In some embodiments, the predetermined expiry condition is an indication that the identifier has not been used in a predetermined amount of time. Other expiry conditions may also be used, as would be readily understood to a worker skilled in the art.

In accordance with embodiments of the present technology, identifier return and reuse is performed at least in part by the dynamic assignment module.

In some embodiments, returning the identifier to the pool may not be performed for every assigned identifier, since identifier assignments may be of indefinite duration in some cases. However, this capability may still exist even if it is unused in many cases.

In some embodiments, returning the identifier to the pool is accompanied by the transmission of a broadcast message which contains a notification that the identifier is being returned to the pool. The message may include the identifier and a code indicating that the identifier is being retired, for example. Terminals in receipt of the message may be configured to cease broadcast message filtering based on the identifier. In some cases, the terminals may be triggered to perform other operations based on receipt of such a broadcast message. For example, terminals may be configured to commence operations for determining a substitute means of receiving necessary information previously provided via the broadcast messages, possibly after a predetermined delay.

Authentication

In some embodiments, since the identifier is set by the MNO or an independent but known third party service, the identifier gives some validation to wireless terminals that the message is legitimate. Furthermore, if the particular web service, to which the identifier has been assigned, has been authenticated, for example by the MNO or third party service, further trust can be placed in the legitimacy of the message. This is assuming the MNO core network and the web service have not been compromised (e.g. A Man in the Middle (MITM) attack where a hacker has put up a fake BTS). To mitigate this unlikely scenario the wireless terminal may also be configured to authenticate with the Web service or MNO before acting upon the received broadcasted message.

In some embodiments, the MNO may be configured to authenticate requests for broadcast access and/or messages provided by the broadcast entity. For example, each message and/or request received by the MNO can be encoded with a certificate, which can be validated by a third party, as would be readily understood by a worker skilled in the art.

In some embodiments, an additional authentication service is provided by which a terminal can verify that a message has been sent by a legitimate sender. For example, in some embodiments, each message can be encoded with a certificate that the terminal can check against. For example the terminal can extract the certificate information and verify it against a third party list. If the received message does not include an expected or authentic certificate value then the message may be ignored.

In some embodiments, the CBS protocol is used to send broadcast messages. The identifier may then generally comprise, but is not necessarily limited to, a dynamically assigned CBS message ID (MID). In some embodiments, each broadcast entity, web service, channel or sub-channel thereof, or the like, is identified by its own MID. In some embodiments, a broadcast entity, web service, channel or sub-channel thereof, or the like, is associated with plural MIDs. Different MIDs of the plurality can be used for designating different information, information intended for different audiences or uses, or the like. In some embodiments, plural broadcast entity, web service, channel or sub-channel thereof, or the like, can share a MID. Broadcast messages containing the same MID but associated with different entities may be differentiated via a variety of mechanisms, for example serial number, time of broadcast, an identifier embedded in the message body, or the like. In one embodiment, the serial numbers may be configured such that performing a modulo operation on the serial number returns a value which can be used to identify the originating broadcast entity out of a plurality of such entities sharing the same MID.

In some embodiments, a single web service with plural types of information may use different identifiers to differentiate between information types, or it may use other identifier information, such as serial numbers or identifiers embedded in message contents, to differentiate between information types. A terminal may then initially process broadcast messages to determine if the information contained therein is relevant to the terminal, by checking the appropriate identifiers and/or other information.

It will be appreciated that, although specific embodiments have been described herein for purposes of illustration, various modifications may be made without departing from the scope of the technology. In particular, it is within the scope of the technology to provide a computer program product or program element, or a program storage or memory device such as a non-transitory storage medium, magnetic or optical wire, tape or disc, or the like, for storing signals readable by a machine, for controlling the operation of a computer according to the method of the technology and/or to structure its components in accordance with the system of the technology.

Further, each step of the methods may be executed on a general computer, such as a personal computer, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the scope of the technology, and all such modifications as would be obvious to one skilled in the art are intended to be included within the scope of the following claims.

We claim:

1. A method for facilitating broadcast communication from a broadcast entity to terminals serviced by a wireless communication network, the method comprising:
   a) receiving, by a computing system, a request for broadcast access to the wireless communication network, the request comprising an indication of a predetermined feature, the request initiated by the broadcast entity, the broadcast entity outside of the wireless communication network;
   b) in response to the request, establishing, by the computing system or by another computing system, a temporary association between the predetermined feature and an identifier selected from a pool of currently unused identifiers;
   c) receiving, by the computing system, one or more messages provided by the broadcast entity, the one or more messages associated with the predetermined feature; and
   d) broadcasting the one or more messages via the wireless communication network, each of the messages broadcast along with the identifier, wherein the terminals are configured to optionally use the identifier to trigger selective processing of the messages;
   wherein, prior to broadcasting the one or more messages, the computing system causes the predetermined feature, the selected identifier and the temporary association therebetween to be made available upon request to the terminals, thereby facilitating authenticated retrieval, by the terminals, of the selected identifier upon specification of the predetermined feature.

2. The method according to claim 1, further comprising returning the identifier to the pool for re-use in response to satisfaction of a predetermined expiry condition.

3. The method according to claim 1, further comprising making available information indicative of the temporary association to at least one of the terminals serviced by the wireless communication network.

4. The method according to claim 1, further comprising extracting the predetermined feature from the one or more messages and matching the predetermined feature with the identifier based on the temporary association.

5. The method according to claim 1, wherein the temporary association is associated with a predetermined geographic region.

6. The method according to claim 1, wherein the identifier is a cell broadcast service (CBS) message identifier (MID) which is unassigned to a static service.

7. The method according to claim 3, wherein the information indicative of the temporary association is made available via one or more of: terminal pre-configuration; terminal configuration via device management messages; broadcast messages; and a lookup service.

8. The method according to claim 1, wherein the request comprises an identifier of the broadcast entity.

9. The method according to claim 1, wherein the predetermined feature comprises one or more of: a session identifier; a web service identifier; a descriptive identifier; an identification of message source; an identification of message type; an identification of an application associated with the message; an identification of a type of application associated with the message; an identification of an intended audience type; and an identification of an intended audience demographic.

10. The method according to claim 1, wherein the received one or more messages are provided subsequent to the request for broadcast transmission.

11. The method according to claim 1, further comprising providing one or more additional identifier fields within the broadcast one or more messages.

12. The method according to claim 1, wherein the temporary association is further assigned a predetermined lease time, the method further comprising returning the identifier to the pool for re-use upon expiry of the predetermined lease time.

13. The method according to claim 12, further comprising transmitting a broadcast message to the terminals indicative that the identifier has been returned to the pool upon returning the identifier to the pool for re-use.

14. The method according to claim 1, further comprising transmitting the request over a secure and authenticated connection between the broadcast entity and the computing system.

15. An apparatus configured to facilitate broadcast communication from a broadcast entity to terminals serviced by a wireless communication network, the apparatus comprising:
   a) a broadcast entity interface configured to receive a request for broadcast access to the wireless communication network, the request comprising an indication of a predetermined feature, the request initiated by the broadcast entity, the broadcast entity outside of the wireless communication network, the broadcast entity interface further configured to receive one or more messages from the broadcast entity, the one or more messages associated with the predetermined feature, the broadcast entity interface comprising network interface electronics hardware;
   b) a dynamic assignment module operatively coupled to the broadcast entity interface, the dynamic assignment module comprising a computer, the dynamic assignment module configured, in response to the request, to:
      i) select an identifier from a pool of currently unused identifiers; and
      ii) establish a temporary association between the broadcast session predetermined feature and the selected identifier; and c) a network interface module operatively coupled to the dynamic assignment module, the broadcast entity interface and the wireless communication network, the network interface module comprising network interface electronics hardware, the network interface module configured to:
  i) convey the one or more messages along with the identifier to the wireless communication network for broadcast thereby, wherein each of the messages is broadcast along with the identifier, and wherein the terminals are configured to optionally use the identifier to trigger selective processing of the messages,
  wherein, prior to broadcasting the one or more messages, the network interface module causes the predetermined feature, the selected identifier and the temporary association therebetween to be made available upon request to the terminals, thereby facilitating authenticated retrieval, by the terminals, of the selected identifier upon specification of the predetermined feature.

16. The apparatus according to claim 15, wherein the dynamic assignment module is further configured to return the identifier to the pool for re-use in response to satisfaction of a predetermined expiry condition.

17. The apparatus according to claim 15, wherein the network interface module is further configured to make available, via the wireless communication network to at least one of the terminals serviced thereby, information indicative of the temporary association.

18. The apparatus according to claim 15, wherein the dynamic assignment module is further configured to extract the predetermined feature from the one or more messages and matching the predetermined feature with the identifier based on the temporary association.

19. The apparatus according to claim 15, wherein the identifier is a cell broadcast service (CBS) message identifier (MID) which is unassigned to a static service.

20. The apparatus according to claim 17, wherein the information indicative of the temporary association is made available via one or more of: terminal pre-configuration; terminal configuration via device management messages; broadcast messages; and a lookup service.

21. The apparatus according to claim 15, wherein the predetermined feature comprises one or more of: a session identifier; a web service identifier; a descriptive identifier; an identification of message source; an identification of message type; an identification of an application associated with the message; an identification of a type of application associated with the message; an identification of an intended audience type; and an identification of an intended audience demographic.

22. The apparatus according to claim 15, the apparatus further configured to provide one or more additional identifier fields within the broadcast one or more messages.

23. A computer program product comprising a non-transitory computer readable memory storing computer executable instructions thereon that when executed by a computer perform a method for facilitating broadcast communication from a broadcast entity to terminals serviced by a wireless communication network, the method comprising:
  a) receiving a request for broadcast access to the wireless communication network, the request comprising an indication of a predetermined feature, the request initiated by the broadcast entity, the broadcast entity outside of the wireless communication network;
  b) in response to the request, establishing a temporary association between the predetermined feature and an identifier selected from a pool of currently unused identifiers;
  c) receiving one or more messages provided by the broadcast entity, the one or more messages associated with the predetermined feature; and
  d) broadcasting the one or more messages via the wireless communication network, each of the messages broadcast along with the identifier, wherein the terminals are configured to optionally use the identifier to trigger selective processing of the messages;
  wherein, prior to broadcasting the one or more messages, the computing system causes the predetermined feature, the selected identifier and the temporary association therebetween to be made available upon request to the terminals, thereby facilitating authenticated retrieval, by the terminals, of the selected identifier upon specification of the predetermined feature.

* * * * *